April 20, 1954     A. D. NUSBAUM     2,676,074

SELF-RETAINING NEEDLE BEARING

Filed Aug. 6, 1952

INVENTOR.
ALAN D. NUSBAUM.
BY Eugene L. Knoblock
ATTORNEY.

Patented Apr. 20, 1954

2,676,074

UNITED STATES PATENT OFFICE 2,676,074

SELF-RETAINING NEEDLE BEARING

Alan D. Nusbaum, Bremen, Ind.

Application August 6, 1952, Serial No. 302,869

8 Claims. (Cl. 308—212)

This invention relates to a self-retaining needle bearing.

Needle bearings are used in large quantities in many different fields of use, and large numbers of them are used in the automotive industry in conjunction with universal joints and other automotive parts. As such bearings are now constructed they fall into two categories, namely, the self-retaining type and the non-self-retaining type. Those bearing constructions which are of the self-retaining type usually require bearing needles or rollers having conical end portions which are confined within grooves at the opposite ends of the bearings as made possible by their conical shape. In other words, because of the conical shape of the ends of the needles, a groove can be formed which will mechanically confine the needles at both ends thereof without projecting radially inwardly a distance greater than the diameter of the needle bearing element. Such bearings are costly, however, because of the cost of formation of the conical ends of the bearings and because of the cost of providing means defining retaining grooves at both ends of a bearing unit, and, consequently, have not received widespread general acceptance, particularly in the automotive industry.

A less expensive bearing is provided in the trade which utilizes a needle bearing element having part-spherical or rounded ends. Such bearings are housed within sheaths or cups and are provided with retainers to prevent longitudinal or axial release of the bearing elements from the bearing cups, but are not commonly provided with mechanical means for positioning or retaining the roller or needle elements against lateral or inward displacement of the bearing elements within the cup or sheath. The lack of such retainers presents problems in assembly of the bearing unit and during the handling or manipulation or application of the bearing unit. In an effort to overcome the disadvantage of a lack of the mechanical retainer, the usual practice in assembling the bearings using round ended needle elements is to apply a large application of grease to the rollers so that the grease may act as an adhesive to retain the bearing elements in operative assembled position while being handled and manipulated and while being assembled. The use of grease as an adhesive in this manner is not wholly satisfactory and considerable difficulty is experienced with the displacement of roller elements from operative position during the handling of the bearing units and their manipulation for purposes of assembly.

A prime object of this invention is to provide a bearing cup or sheath so constructed that individual bearing elements may be inserted therein and retained in place thereby to facilitate assembly of a bearing unit and retention of the individual bearing elements in operative relation when assembled.

A further object is to provide a self-retaining bearing utilizing a needle bearing element having a substantially cylindrical contour and rounded ends, which bearing includes a groove formed in one end portion of a sheath or bearing retainer and which is defined by an inner substantially cylindrical wall, said groove receiving the cylindrical end portions of roller elements rotatably and snugly so as to cooperate with the interior cylindrical surface of the bearing sheath to prevent any substantial displacement of the bearing element from parallel relation to the axis of the bearing unit either by radial inward tilting or tilting in a circumferential direction.

A further object is to provide a bearing construction in which a greater proportion of the total length of each bearing element is utilized as an actual bearing surface, than in previous needle bearing constructions.

Other objects will be apparent from the following specification.

Figure 1:
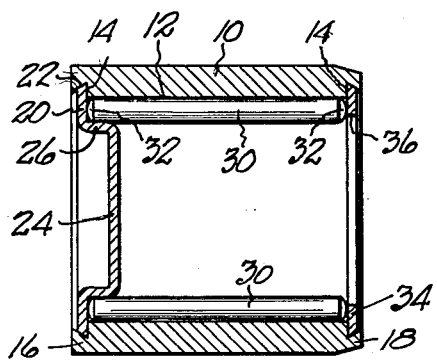
Fig. 1 is an axial sectional view of the bearing taken on line 1—1 of Fig. 2.
Figure 2:
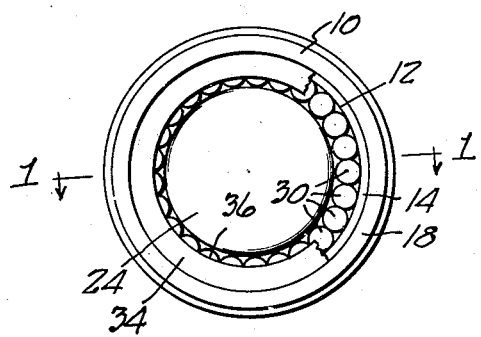
Fig. 2 is an end view of the bearing with parts broken away.

Referring to the drawing which illustrates several embodiments of the invention, and particularly to the embodiment illustrated in Figs. 1 and 2, the numeral 10 designates a sheath or cup body which has a cylindrical bore 12 extending for the major portion of its length. The member 10 may be formed from metal tubing cut to desired length. The opposite end portions of the body 10 are of reduced wall thickness, being defined by an enlarged end bore portion presenting a flat transverse annular shoulder 14 adjacent each end portion and facing outwardly, and lip portions 16 and 18 at the respective ends of the body 10.

One end of the body 10 mounts a closure which is preferably a metal stamping and is characterized by a flat annular marginal portion 20 which bears flat against the shoulder 14 of the body 10 and is anchored fixedly in that position by any means found suitable. As here illustrated, the inner surface of the lip 16 is formed or shaped at 22 to bear against the outer edge of the plate portion 20 and restrict the mouth of the tube either uniformly as by spinning or at localized areas as by staking or peening to restrict the size of the mouth to a dimension less than the diameter of the plate portion 20. It will be understood also that the plate portion 20 may be secured in place by the use of snap rings (not shown), by welding, by a press fit or a shrink fit, or by any other means found suitable. The closure plate has a central portion 24 offset inwardly from the plane of the marginal portion 20 and integrally connected thereto by a substantially cylindrical wall portion 26 whose outer or large diameter surface is co-axial with the cylindrical bore 12 of the body 10. The arrangement is such that, when the closure is held or secured fixedly in place upon the end of the body 10, an annular groove is defined in the interior of the body 10 whose inner wall constitutes the plate portion 26. The inner and outer circumferential walls of this groove are substantially parallel, and the depth of the groove is substantially equal to its width and constitutes only a small fraction of the total length of the body 10. It will be understood that it is not necessary that the depth of this annular groove be equal to its width although that approximate relationship is preferred.

A plurality of rollers or needle bearings 30 fit in the body with one end portion extending into the groove around the wall 26. Each of these bearings is preferably of the well known needle bearing type which is of substantially uniform cross-sectional size throughout its length and whose end portions 32 are rounded or substantially part-spherical. The rollers are of a diameter to fit snugly and with slight clearance in the groove. In practice a clearance of .002 inch is preferred to permit rotation of the rollers within the groove and at the same time afford a fit sufficiently snug for the purposes of this invention. It will be understood that clearances up to .005 inch or even greater may be employed, but as the clearance is increased from .002 inch the possibility occurs that some of the advantages of the invention may be sacrificed.

The ratio of the depth of the inner groove wall 26 to the overall length of the bearings 30 is preferably one to eight. This ratio is not critical, however, and the depth may be either greater or less, depending upon the over-all length of the bearing elements with respect to their diameter. Thus, in instances where roller elements are longer in comparison to their diameter than here illustrated, the ratio of the depth of the wall 26 to the length of the roller may vary correspondingly. In practice the desired ratio may be determined as being the shortest axial dimension of the inner wall 26 which will define a groove of a depth sufficient to hold a single roller in substantially upright position when the body 10 is positioned with its axis vertical. In this connection, the wall 26 must be of a length to prevent radial inward tilting of a bearing sufficient to disengage itself from the groove, and must also, in cooperation with the full extent of the long cylindrical wall surface 12, substantially limit circumferential tilting of the roller element. It will be evident that the ratio of the depth of the wall 26 to the overall length of the roller will have primarily a relation to the diameter of the roller rather than a relation to the length of the roller, to accomplish this purpose, and for this purpose the axial dimension of the wall 26 should be at least equal to the radius of the roller elements and preferably slightly greater than the radius of the roller elements.

A retainer ring 34 fits within the lip 18 bearing flat against the wall surface 14 and being anchored by any means found suitable. Thus the ring 34 may be anchored in place by deforming of the inner surface of the lip 18, by welding, by soldering, by a press fit, by a shrink fit, by the use of a snap ring (not shown), or by any of the other securing means well known in the metal working art. The inner circumference 36 of the ring 34 is greater than the outer circumference of the wall 26 so as to provide clearance with the shaft (not shown) which extends into the bearing through said ring. The roller elements 30 will preferably be of an overall length slightly less than the spacing of the inner faces of the closure portion 20 and the retainer ring 34 to avoid interference with the rotation of the rollers, the clearance being limited, however, to an extent which will insure against any objectionable axial movement of the rollers 30.

Figure 3:
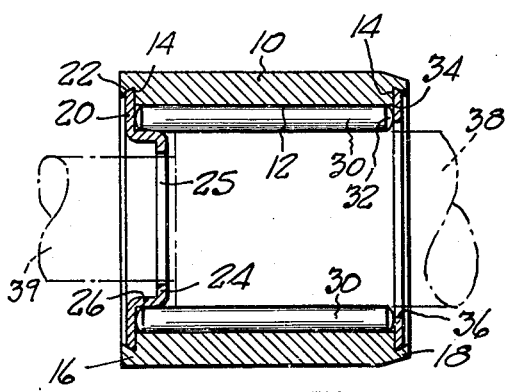
Fig. 3 is an axial sectional view of a modified embodiment of the bearing.

In the embodiment of the invention illustrated in Fig. 3, the construction is substantially the same as that in Figs. 1 and 2. The principal difference in this instance, however, is in the formation of an aperture 25 in the inwardly offset portion 24 of the closure. The aperture 25 is concentric with the bearing and permits the mounting of the bearing upon an intermediate portion of a shaft where that shaft is of stepped formation, as illustrated in dotted lines in Fig. 3. In other words, the shaft portion 38 which fits within and is journaled by the bearing rollers 30 is larger than the shaft portion 39 which passes through the aperture 25, it being understood that the difference will be sufficient to afford clearance of the shaft portion 39 within the opening 25.

Figure 4:
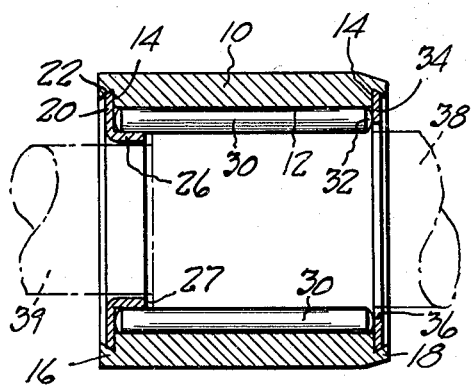
Fig. 4 is an axial sectional view of another modified embodiment of the bearing.

The embodiment of the invention illustrated in Fig. 4 is designed to reduce the size of the step between the portions 38 and 39 of a shaft journaled in a bearing, and for this purpose the cylindrical portion of the closure is provided with a terminal inner edge 27 so that the inner circumference of the cylindrical portion 26 is entirely exposed and is the minimum circumferential dimension of the bearing. Consequently, the reduced portion 39 of the shaft need be smaller than the shaft portion 38 only by an extent such that the radial dimensions of the two shaft portions differ only slightly more than the wall thickness of the cylindrical portion 26.

Figure 5:
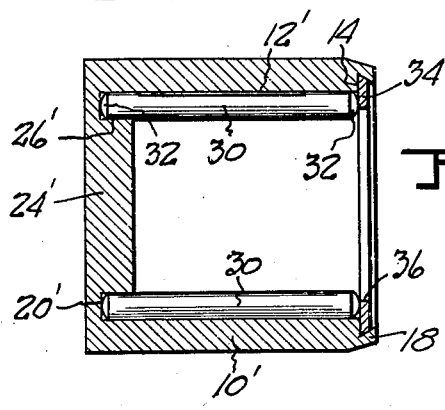
Fig. 5 is an axial sectional view of still another embodiment of the bearing.

In the embodiment of the invention illustrated in Fig. 5, the cup which receives the bearing elements is formed as a single unit, as by machining, so that the tubular wall 10' and the end wall 24' are integral. The cup has its bore 12' machined therein and has a groove 20' concentric with the bore 12' formed in the end wall 24' with its outer surface defining a continuation of the bore 12'. Thus the inner circumferential wall 26' of the groove serves the same retaining function with respect to the bearing elements 30 as is served by part 26. It will be understood that the wall 24' need not be continuous in this embodiment, but may be apertured to accommodate a reduced shaft portion in the manner illustrated in Figs. 3 and 4. Also, the parts may be transposed, to make retainer 34 integral with the body 10, and part 20, 24, 26 separate from the body 10 as in Fig. 1.

This bearing construction possesses outstanding advantages. It constitutes the first self-retaining type of bearing assembly which uses rollers having rounded ends. It is definitely superior to bearings using round ended elements but not having retainers, because the function of the groove to position bearings against tilting or release facilitates manipulation of the bearing, insures that once the bearing has been assembled the bearing elements will not release or become disengaged, and accomplishes these beneficial results without substantial increase in cost. The bearing is superior to constructions using cone ended bearing elements, because of reduction in cost and because of ease and simplicity of assembly.

Of interest in this construction is the fact that the closure 24, 26 is substantially relieved of wear after the bearing has been mounted upon a shaft, so that the use of sheet metal for these parts is feasible and practical. In this connection it will be apparent that, when mounted upon a shaft, the rollers no longer roll upon the wall 26 but roll upon the shaft itself.

Another important advantage of this construction is the fact that the present construction makes possible in a bearing of any given diameter using roller elements of any selected cross-sectional size, a gain in load capacity where the overall length of the bearing remains the same. In other words, the present construction makes available a substantially greater proportion of the length of each needle bearing element for loading purposes as compared to conventional bearing cups using needle elements. The use of spherical end roller bearings is important in this construction by reason of the long wear which such rollers afford to the bearing unit.

One of the outstanding advantages of the construction is the simplicity of assembly afforded by the mechanical retention of each individual bearing element by the groove provided. Thus, all that is required in assembly is the proper insertion of the bearing elements in the first instance since the bearings will not become displaced after they have been inserted in proper position, unless, of course, the whole structure is inverted before the retainer ring is applied. Once the retainer ring has been applied, however, the rollers will maintain themselves in operative location within the body regardless of the position in which the bearing element is held.

While the preferred embodiments of the invention have been illustrated and described herein, it will be understood that changes in construction may be made within the scope of the appended claims without departing from the spirit of the invention.

I claim:

1. A self-retaining roller bearing comprising a body having a cylindrical bore, a closure carried by and concentric with one end of said body and cooperating with said bore to define an annular groove having a substantially cylindrical inner wall, roller members arranged in a circumferential series in said body with an end portion of each fitting snugly and rotatably in said groove, and a retainer ring carried by the other end of said body, the inner cylindrical wall of said groove being spaced radially from said bore a distance substantially equal to the diameter of said roller members.

2. A self-retaining roller bearing comprising a body having a cylindrical bore and an inwardly facing annular groove concentric with and defined in part by said bore, said groove having a substantially cylindrical inner wall, a plurality of roller bearing members each having part spherical end portion, each roller bearing member having a snug rotative fit in said groove inwardly of said part-spherical end portion thereof, and a retainer ring carried by the end portion of said body opposite said groove.

3. A self-retaining roller bearing comprising a body having a cylindrical bore, a closure carried by one end of said body and cooperating with said bore to define an annular groove having a substantially cylindrical inner wall and an outer cylindrical wall forming a continuation of said bore, roller members of a diameter substantially equal to the width of said groove arranged in a circumferential series in said body with an end portion of each fitting snugly and rotatably in said groove, and a retainer ring carried by the other end of said body, said closure having a shaft-receiving opening concentric with said bore.

4. A self-retaining roller bearing comprising an open-ended body having a cylindrical bore, a closure carried by one end of said body and cooperating with said bore to define an annular groove having a substantially cylindrical inner wall, roller members arranged in a circumferential series in said body with an end portion of each having a diameter substantially equal to the width of said groove and fitting snugly and rotatably in said groove, and a retainer ring carried by the other end of said body, said closure constituting an annular metal stamping fixedly secured to said body at its outer circumferential portion.

5. A self-retaining roller bearer comprising a body having a cylindrical bore and an inwardly facing annular groove concentric with and defined in part by said bore, said groove having a substantially cylindrical inner wall, a plurality of bearing members each having a snug rotative fit in said groove, and a retainer ring carried by the end portion of said body opposite said groove, said groove being of a depth substantially equal to its width.

6. A self-retaining roller bearing comprising a body having a cylindrical bore and an inwardly facing annular groove concentric with and defined in part by said bore, said groove having a substantially cylindrical inner wall, a plurality of bearing members each having a snug rotative fit in said groove, and a retainer ring carried by the end portion of said body opposite said groove, said rollers having rounded ends, said groove being of a depth sufficient to retain a single roller substantially upright when said body is positioned with its axis upright.

7. A self-retaining roller bearing comprising a tubular body, a closure carried by one end of said body and including a substantially cylindrical portion projecting into said tube and cooperating therewith to define an annular groove, a plurality of rollers within said body projecting rotatably into said groove, said rollers being of a diameter to be confined by the groove in a position substantially parallel to the axis of the body, and a retainer ring carried by the other end of said body.

8. A self-retaining roller bearing comprising a tubular body, a closure carried by one end of said body and including a substantially cylindrical portion projecting into said tube and cooperating therewith to define an annular groove, a plurality of rollers within said body projecting rotatably into said groove, and a retainer ring carried by the other end of said body, said body having end portions of reduced wall thickness and having enlarged mouths terminating at annular transverse shoulders, said closure and retainer ring each being fixedly received within an end portion and bearing against said shoulder.

References Cited in the file of this patent

UNITED STATES PATENTS

| Number | Name | Date |
|---|---|---|
| 2,018,768 | Swenson | Oct. 29, 1935 |
| 2,063,787 | Brown | Dec. 8, 1936 |
| 2,271,974 | Greiner | Feb. 3, 1942 |
| 2,336,579 | Venditty | Dec. 14, 1943 |